United States Patent [19]

Long

[11] 4,138,838
[45] Feb. 13, 1979

[54] LOCKING MECHANISM FOR RAKE BASKET CRANK

[75] Inventor: John H. Long, Narvon, Pa.

[73] Assignee: Sperry Rand Corporation, New Holland, Pa.

[21] Appl. No.: 820,666

[22] Filed: Aug. 1, 1977

[51] Int. Cl.² .................................................. A01D 77/06
[52] U.S. Cl. ...................................... 56/377; 56/15.8; 403/97; 403/146
[58] Field of Search ................... 56/377, 15.8; 403/97, 403/146

[56] References Cited

U.S. PATENT DOCUMENTS 2,781,626  2/1957  Happe et al. .......................... 56/377

*Primary Examiner*—Jay N. Eskovitz
*Attorney, Agent, or Firm*—John B. Mitchell; Frank A. Seemar; Ralph D'Alessandro

[57] ABSTRACT

A locking mechanism for the height adjusting suspension system of side delivery rake is disclosed. A support trunnion bearing for the rotatable axially-adjustable height control rod of a rake has at least one crown thereon to cooperatively engage a mating washer which is biased into contact therewith by a compression suspension spring to thereby impede relative rotational movement between the rod and the bearing.

2 Claims, 3 Drawing Figures

LOCKING MECHANISM FOR RAKE BASKET CRANK

BACKGROUND OF THE INVENTION

This invention relates generally to agricultural rakes, and specifically to a locking mechanism for the height adjusting suspension system of a side delivery rake.

Side delivery rakes are generally well known in the agricultural industry as apparatus for consolidating swath-cut hay-type crops into windrows, or for turning windrows to promote more uniform drying. Most commonly, a single hay rake is pulled across the field behind a tractor, or other similar vehicle; however, with the use of a special hitch it is possible to arrange two or more rakes in tandem to decrease operation time.

The invention disclosed herein is primarily an improvement in a side delivery rake as shown, for example, in U.S. Pat. No. 2,781,626. With brief reference to FIGS. 1 and 2 of that patent, it can be seen that subframe S is supported below a main frame F and is adjustable in height relative thereto by, in part, rotatable rod 21 which through axial adjustment raises and lowers the aft end of the subframe. Crank 24 is manually rotated to effect the height adjustment. A compression spring 25 maintains the proper bias between the crank and a bearing 22, and also serves as a resilient suspension member for the subframe.

The problem with the rake described, and for which the instant invention supplies a solution, is that actual field operation affects the stability of the height adjustment setting. Initially, the crop engaging portion of the rake, depending from subframe S, is adjusted to the desired position relative to the ground by manipulation of crank 24. As the rake is moved across the field, the subframe is subjected to varying vertical forces related to field surface irregularity. The vertical forces are substantially absorbed by the spring 25; however, particularly under rough field conditions, there is a tendency for the crank 24 to be completely rotated and thus become misadjusted.

BRIEF SUMMARY OF THE INVENTION

It is an object of the instant invention to provide an improved height adjustment suspension system for an agricultural implement.

It is another object of the instant invention to provide a locking mechanism for the height adjustment suspension system of a side delivery rake.

It is a further object of the instant invention to provide a locking mechanism for the height adjusting suspension system of a side delivery rake which is simple in design, inexpensive of manufacture and extremely effective in use.

These and other objects are obtained according to the instant invention by providing a novel locking mechanism for the height adjusting suspension system of a side delivery rake. A support trunnion bearing for the rotatable axially-adjustable height control rod of a rake has at least one crown thereon to cooperatively engage a mating washer which is biased into contact therewith by a compression suspension spring to thereby impede relative rotational movement between the rod and the bearing.

BRIEF DESCRIPTION OF THE DRAWINGS

The advantages of this invention will become apparent upon consideration of the following detailed disclosure of the invention, especially when taken in conjunction with the accompanying drawings wherein.

DESCRIPTION OF THE PREFERRED EMBODIMENT

Figure 1:
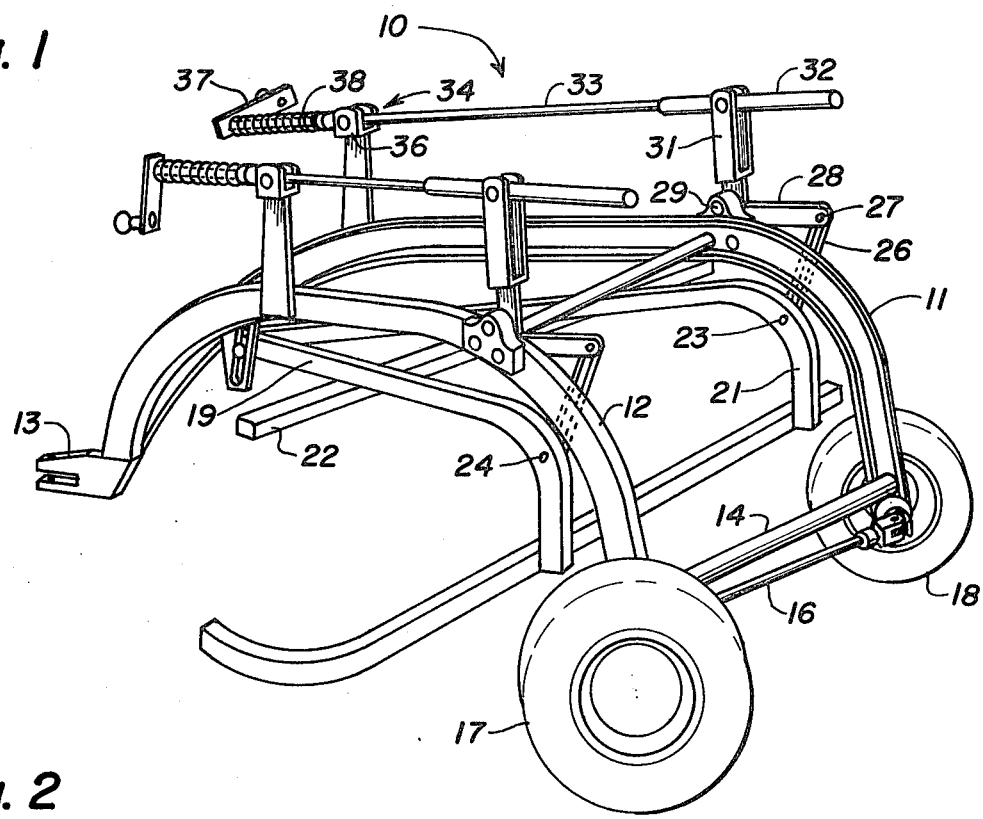
FIG. 1 is a perspective view of a side delivery rake employing the concepts of the instant invention.

The rake shown generally as 10 in FIG. 1 is manufactured by Sperry New Holland under the trademark "Rolabar" and is very well known in the agricultural industry. It should be noted and understood that the invention to be described relates to the particular type of height adjusting suspension system used in this rake; however, there is no intent to limit the invention to a specific manufactured article, but rather only to a specific type of height adjusting suspension system.

As described in more detail in the above-noted 2,781,626 patent, rake 10 comprises a main frame with a subframe suspended thereunder. The main frame of the rake structure comprises a pair of medially upwardly arched rigid channel members 11 and 12 interconnected at their forward ends by a clevis or hitch member 13 whereby the frame may be coupled to the drawbar of a tractor and towed therebehind in the manner described. Frame members 11 and 12 diverge rearwardly from the hitch member 13 and are suitably interconnected by cross braces such as 14. Journalled between the depending rear ends of the members 11 and 12 is an axle 16 on which are carried ground engaging wheels 17 and 18 for supporting the rear end of the frame as it is drawn behind the tractor.

Suspended beneath the main frame in advance of its wheels 17 and 18 is an adjustable subframe which includes a pair of forwardly converging frame members 19 and 21 supporting a rake basket 22 in which may be operably disposed a raking reel of the well known roller bar type in which a plurality of raking bars are supported between relatively longitudinally and laterally displaced spiders rotating about parallel axes in well known manner. Reel basket 22 is not shown in detail, it being understood to be a well known sub-element of apparatus of the character being described.

The subframe is universely suspended from the main frame at each of three relatively spaced points or locations which are independently vertically adjustable so that vertical adjustment of any one such point or location will tilt the subframe about an axis extending between the remaining two points. The two points of primary importance to the instant invention are defined by the universal fittings for connections 23 and 24 which are in relative alignment parallel to the major axis of the rake basket 22. Connection 23 includes a link 26 which is universally swingably suspended at point 27 from the free end of supporting lever 28 fulcrumed at 29 on the main frame element 11. Lever 28 includes a bifurcated portion 31 in which an internally threaded sleeve member 32 is trunnioned. An adjusting screw 33 threaded into sleeve 32 has an externally projecting unthreaded shank rotatable through a sleeve bearing 34 trunnioned in a bracket 36 fixed to main frame element 11.

A crank 37 on screw 33 provides means for manually rotating said screw to axially adjust its position within its sleeve 32. A spring 38 disposed under compression on the crank 37 acts through the screw 33, threaded sleeve 32 and lever 28 to provide a floating support for its associated suspended portion of the subframe. A duplicate height adjusting suspension mechanism is disposed on main frame element 12.

Figure 2:
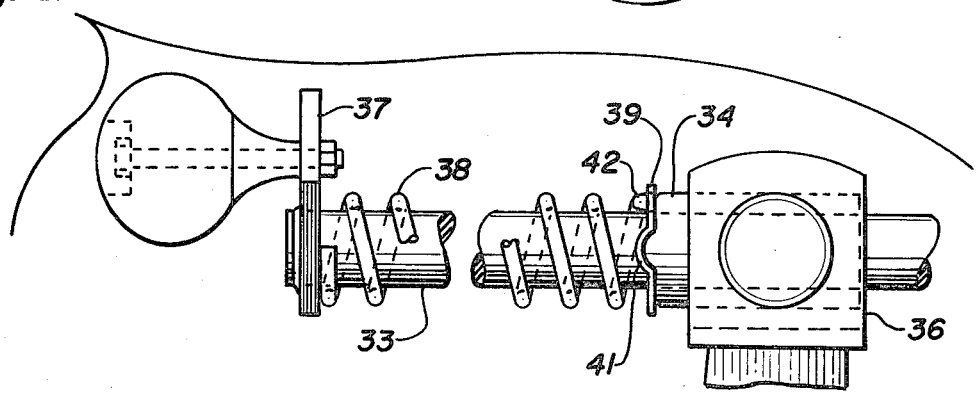
FIG. 2 is a side plan view, in partial cross section, of the locking mechanism of the instant invention.

FIG. 2 shows a side plan view, in partial cross section, of the forward end of the screw and crank height adjusting mechanism of FIG. 1. The trunnion bearing 34 is shown to be supported on either side by the bifurcated bracket 36, and to be engaged on its forward end by a washer 39 which is biased into contact therewith by spring member 38 acting against crank 37. Washer 39 can be seen to have a raised portion, or irregular surface configuration 41 and a stop element 42 thereon for engagement with the free end of spring 38.

Figure 3:
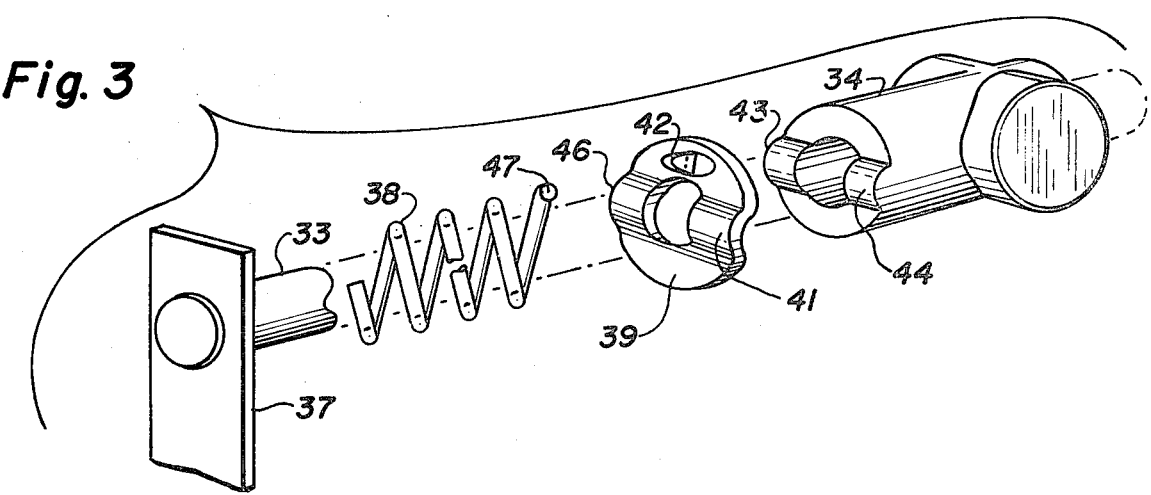
FIG. 3 is an exploded perspective view of the locking mechanism of FIG. 2.

As best seen in FIG. 3, in its preferred embodiment trunnion bearing 34 has two crowns 43 and 44 on the surface thereon on opposite sides of the opening through which screw element 33 extends, and washer 39 has two surface irregularities 41 and 46 thereon matching the crowns on member 34. When in proper alignment, the surface irregularities 41–46 on washer 39 mate with the crown 43 and 44 on element 34 to impede relative rotation between the member 33 and the bearing 34. Under normal operating circumstances, spring element 38 is continuously under compression to thereby force the washer 39 into the desired contact with bearing 34. The stop element 42 may take any suitable form; however, for convenience it is shown to be a punched out portion of the washer bent to a suitable angle to protrude into the path of the end 47 of spring member 38. Any suitable number of crowns, and mating washer irregularities, may be employed depending upon the desired degree of control.

It will be understood that various other changes of the details, materials, steps, arrangements of parts and uses which have been herein described and illustrated in order to explain the nature of the invention will occur to and may be made by those skilled in the art, upon a reading of the disclosure, and such changes are intended to be included within the principles and scope of the invention.

Having thus described the invention, what is claimed is:

1. In a crop handling apparatus having a main frame supported for movement along the ground, a subframe including crop engaging means, and a height adjusting suspension system interconnecting said main frame and subframe, said height adjusting suspension system including an elongate rod having a crank on one end and a threaded portion on the other end, a trunnion bearing fixedly connected to said main frame and supporting said rod adjacent said crank, a compression spring around said rod between said crank and said bearing, a washer on said rod between said spring and said bearing, said threaded end of said rod threadably connected to a pivotable linkage interconnecting said main frame and subframe whereby rotation of said crank causes said subframe to move vertically relative to said main frame, the improvement in said height adjusting and suspension system comprising:

at least one crown on said bearing directed towards said crank end of said rod; and said washer includes a spring-engaging means on one flat surface thereof and a first surface irregularity on the other flat surface thereof shaped substantially the same as said crown.

2. The crop handling apparatus of claim 1, wherein: there are two substantially identical crowns on said bearing spaced on opposing sides of said rod and directed toward said crank end of said rod; and said other flat surface of said washer includes a second surface irregularity substantially similar to said first surface irregularity and positioned on said washer such that said first and second surface irregularities may engage said two crowns.

* * * * *